US009719556B2

(12) United States Patent
Kim

(10) Patent No.: US 9,719,556 B2
(45) Date of Patent: Aug. 1, 2017

(54) JOURNAL FOIL AIR BEARING

(71) Applicant: TNE KOREA CO., LTD., Daejeon (KR)

(72) Inventor: Kyeong Su Kim, Daejeon (KR)

(73) Assignee: TNE KOREA CO., LTD., Daejeon (KR)

(*) Notice: Subject to any disclaimer, the term of this patent is extended or adjusted under 35 U.S.C. 154(b) by 0 days.

(21) Appl. No.: 15/312,474

(22) PCT Filed: Mar. 14, 2016

(86) PCT No.: PCT/KR2016/002492
§ 371 (c)(1),
(2) Date: Nov. 18, 2016

(87) PCT Pub. No.: WO2016/153202
PCT Pub. Date: Sep. 29, 2016

(65) Prior Publication Data
US 2017/0097039 A1    Apr. 6, 2017

(30) Foreign Application Priority Data
Mar. 20, 2015 (KR) .................. 10-2015-0039032

(51) Int. Cl.
F16C 32/06    (2006.01)
F16C 17/02    (2006.01)
F16C 27/02    (2006.01)

(52) U.S. Cl.
CPC ............ F16C 17/024 (2013.01); F16C 27/02 (2013.01); F16C 32/0614 (2013.01)

(58) Field of Classification Search
CPC ...................................................... F16C 17/024
See application file for complete search history.

(56) References Cited

U.S. PATENT DOCUMENTS 7,350,976 B2* 4/2008 Ohtsuki .................. B60B 27/00
                                                          384/448
7,615,291 B2* 11/2009 Lee ...................... C09D 7/1216
                                                          428/701
(Continued)

FOREIGN PATENT DOCUMENTS

JP    2004-183830 A    7/2004
JP    2012-193833 A    10/2012
(Continued)

Primary Examiner — Thomas R. Hannon
(74) Attorney, Agent, or Firm — Korus Patent, LLC; Seong Il Jeong

(57) ABSTRACT

A journal foil air bearing includes: a top foil located to face an outer circumferential surface of a rotating shaft and surround the rotating shaft; a bump foil being an elastically deformable member and located to surround the top foil; a base foil located to surround the bump foil, and a coupling unit configured to couple the first end portion of the top foil, the first end portion of the bump foil, the first end portion of the base foil, and the second end portion of the base foil, wherein the base foil, the bump foil, and the top foil are modularized into one piece by the coupling unit. According to the present invention, the journal foil air bearing may be easily assembled in advance and modularized into one piece, may be very conveniently mounted or disassembled on a bearing housing in a workplace.

9 Claims, 11 Drawing Sheets

(56) References Cited

U.S. PATENT DOCUMENTS

| | | | |
|---|---|---|---|
| 8,353,631 B2* | 1/2013 | Kim | F16C 17/024 |
| | | | 384/103 |
| 8,356,940 B2* | 1/2013 | Inoue | B60B 27/0005 |
| | | | 384/448 |
| 8,672,549 B2 | 3/2014 | Flora et al. | |
| 2016/0377114 A1* | 12/2016 | Dahinten | F16C 17/024 |
| | | | 384/106 |

FOREIGN PATENT DOCUMENTS

| KR | 10-2009-0043161 A | 5/2009 |
|---|---|---|
| KR | 10-2011-0023319 A | 3/2011 |

\* cited by examiner

JOURNAL FOIL AIR BEARING

TECHNICAL FIELD

The present invention relates to a journal foil air bearing, and more particularly, to a journal foil air bearing that may be easily assembled in advance and modularized into one piece, may be very conveniently mounted or disassembled on a bearing housing in a workplace, and may be easily stored and managed.

BACKGROUND ART

An air bearing refers to a bearing that supports a load by lifting a rotating shaft due to the pressure of air compressed between the rotating shaft and the bearing.

In the air bearing, when viscous gas such as air, which is moving along with a moving surface, meets a stationary surface and is compressed, the pressure of air between the moving surface and the stationary surface rises to lift upward the moving surface.

Examples of the air bearing include a thrust air bearing for supporting a load applied in a longitudinal direction of the rotating axis and a journal air bearing for supporting a load applied in a radial direction of the rotating shaft.

A journal foil air bearing, which is a type of journal air bearing, uses a thin foil in order to more easily create pressure and improve dynamic stability at a high speed.

FIG. 13 illustrates a conventional journal foil air bearing 1. The conventional journal foil air bearing 1 includes a top foil 2 that is located to face an outer circumferential surface of a rotating shaft F that rotates in a preset rotation direction W and surrounds the rotating shaft F and a bump foil 3 that is an elastically deformable member having a wave shape and is located to surround the top foil 2. One end portions of the top foil 2 and the bump foil 3 are welded to a welding portion 4 on an inner surface of a bearing housing S.

Although the conventional journal foil air bearing 1 may more easily perform dimensional control because the number of parts is relatively reduced, the conventional journal foil air bearing 1 has problems in that it is very difficult to mount or disassemble the conventional journal foil air bearing 1 on the bearing housing S and it is also very difficult to store and manage elements, that is, the op foil 2 and the bump foil 3, of the conventional journal foil air bearing 1 in a workplace.

The conventional journal foil air bearing 1 also has problems in that since the bump foil 3 is directly mounted on an inner circumferential surface of the bearing housing S and the inner circumferential surface of the bearing housing S has to be processed to have a certain roughness as well as a size dimension, a specific process such as grinding or coating has to be additionally performed on the inner circumferential surface of the bearing housing S, thereby increasing total product costs.

In order to solve the problems of the conventional journal foil air bearing 1, a sleeve bearing in which the top foil 2 and the bump foil 3 are assembled in advance and modularized on an inner circumferential surface of a sleeve having a metal ring shape and then is assembled on the bearing housing S has been suggested. However, the sleeve bearing still has problems in that since the sleeve is added, a tolerance between parts has to be more precisely managed.

Although the top foil 2 and the bump foil 3 of the conventional journal foil air bearing 1 are fixedly welded onto the inner surface of the bearing housing 5, the top foil 2 and the bump foil 3 may be fixed by using any of various other methods, for example, by using a key or by using bolts and pins. However, such methods have problems in which technical uncertainty, difficulty in an assembling/disassembling process, and product costs are increased.

DETAILED DESCRIPTION OF THE INVENTION

Technical Problem

In order to solve the problems, the present invention provides a journal foil air bearing that may be easily assembled in advance and modularized into one piece, may be very conveniently mounted or disassembled on a bearing housing in a workplace, and may be easily stored and managed.

Technical Solution

In order to solve the problems, according to the present invention, a journal foil air bearing for supporting a load applied in a radial direction of a rotating shaft that rotates about a central line includes: a top foil located to face an outer circumferential surface of the rotating shaft and surround the rotating shaft; a bump foil being an elastically deformable member and located to surround the top foil; and a base foil located to surround the bump foil, wherein a first end portion of the top foil and a first end portion of the bump foil are located between a first end portion of the base foil and a second end portion of the base foil, wherein the journal foil air bearing further includes a coupling unit configured to couple the first end portion of the top foil, the first end portion of the bump foil, the first end portion of the base foil, and the second end portion of the base foil, wherein the base foil, the bump foil, and the top foil are modularized into one piece by the coupling unit and then the one piece is mounted.

A receiving portion in which the first end portion of the top foil, the first end portion of the bump foil, and the second end portion of the base foil are received may be formed on the first end portion of the base foil, wherein the coupling unit couples the first end portion of the top foil, the first end portion of the bump foil, and the second end portion of the base foil received in the receiving portion to the receiving portion of the base foil.

The receiving portion may include a receiving space formed by bending the first end portion of the base foil into a "∩" shape.

The top foil, the bump foil, and the base foil may respectively include insertion portions formed by bending the first end portion of the top foil, the first end portion of the bump foil, and the second end portion of the base foil into "L" shapes so that the insertion portions are received in the receiving portion.

The receiving portion may protrude in the radial direction from an outer circumferential surface of the base foil.

The coupling unit may include: coupling holes formed in the receiving portion, the first end portion of the top foil, the first end portion of the bump foil, and the second end portion of the base foil which are received in the receiving portion; and a coupling member inserted into the coupling holes to fix the top foil, the bump foil, and the base foil.

One pair of the coupling holes may be formed to be spaced apart by a predetermined interval along the central line, and both end portions of the coupling member that is a thin plate member having a "└┘" shape may be respectively inserted into the one pair of the coupling holes and then are bent to undergo plastic deformation.

An assembly direction identification groove for preventing an error in an assembling or mounting process may be formed in at least one of the top foil, the bump foil, and the base foil.

At least one of the top foil, the bump foil, and the base foil may have a shape that may be mass-produced by using press working.

A coating material including polytetrafluoroethylene (PTFE) may be applied to one surface of the top foil that faces the outer circumferential surface of the rotating shaft.

Advantageous Effects of the Invention

According to the present invention, since a journal foil air bearing includes a top foil that is located to face an outer circumferential surface of a rotating shaft and surrounds the rotating shaft; a bump foil that is an elastically deformable member and is located to surround the top foil; and a base foil that is located to surround the bump foil, a receiving portion, in which a first end portion of the top foil, a first end portion of the bump foil, and a second end portion of the base foil are received, is formed on a first end portion of the base foil, and the journal foil air bearing includes a coupling unit that couples the first end portion of the top foil, the first end portion of the bump foil, the second end portion of the base foil received in the receiving portion to the receiving portion of the base foil, the journal foil air bearing may be easily assembled in advance and modularized into one piece, may be very conveniently mounted or disassembled on a bearing housing in a workplace, and may be easily stored and managed.

Also, according to the present invention, since the base foil may maintain and support outer appearances of the bump foil and the top foil, and an inner circumferential surface of the base foil is formed of a smooth thin plate and thus has a shape tolerance and a surface friction that are better than those of an inner circumferential surface of the bearing housing, even when a surface finish state of an inner surface of the bearing housing is poor, the journal foil air bearing may be easily mounted and the performance of the journal foil air bearing may be hardly affected, unlike a conventional journal foil air bearing.

BEST MODE

Preferred embodiments of the present invention will now be described more fully with reference to the accompanying drawings.

Figure 1:
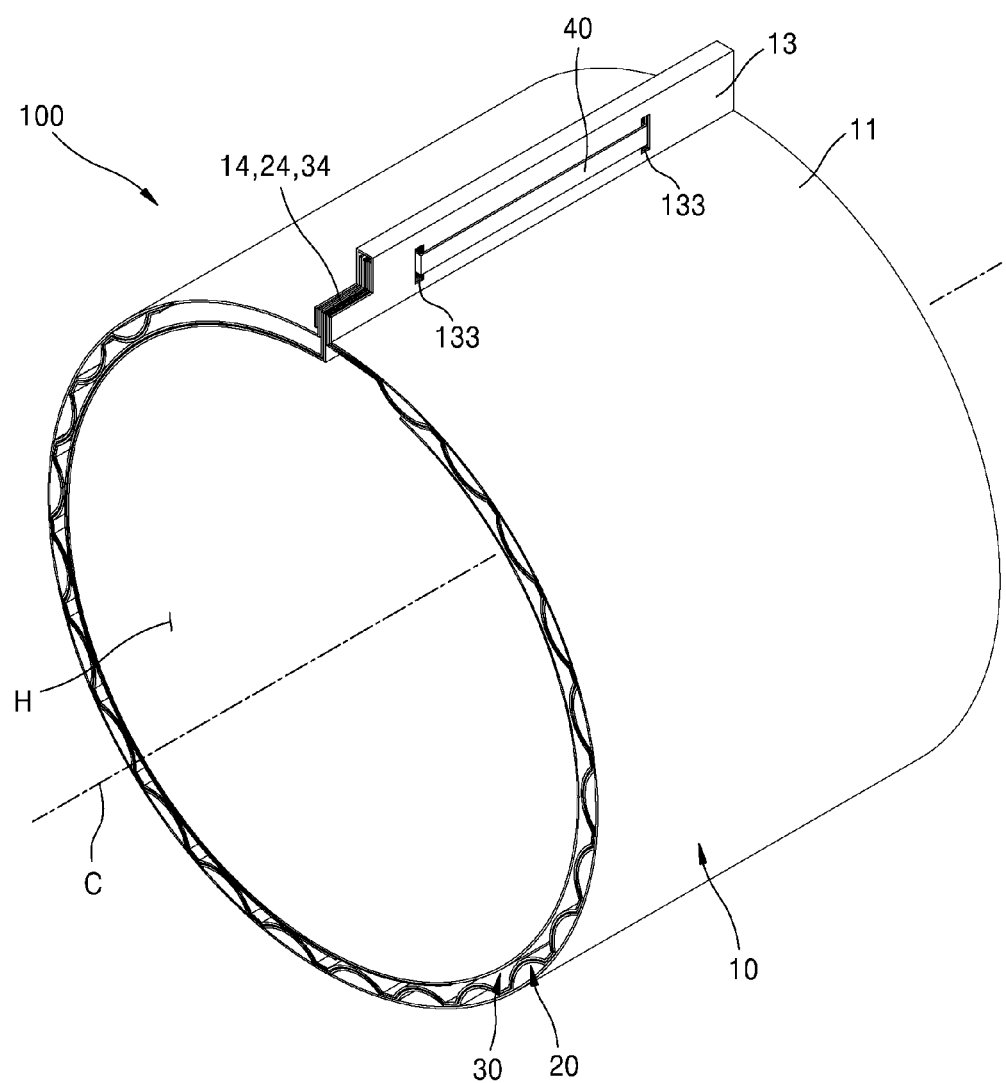
FIG. 1 is a perspective view of a journal foil air bearing according to an embodiment of the present invention.
Figure 2:
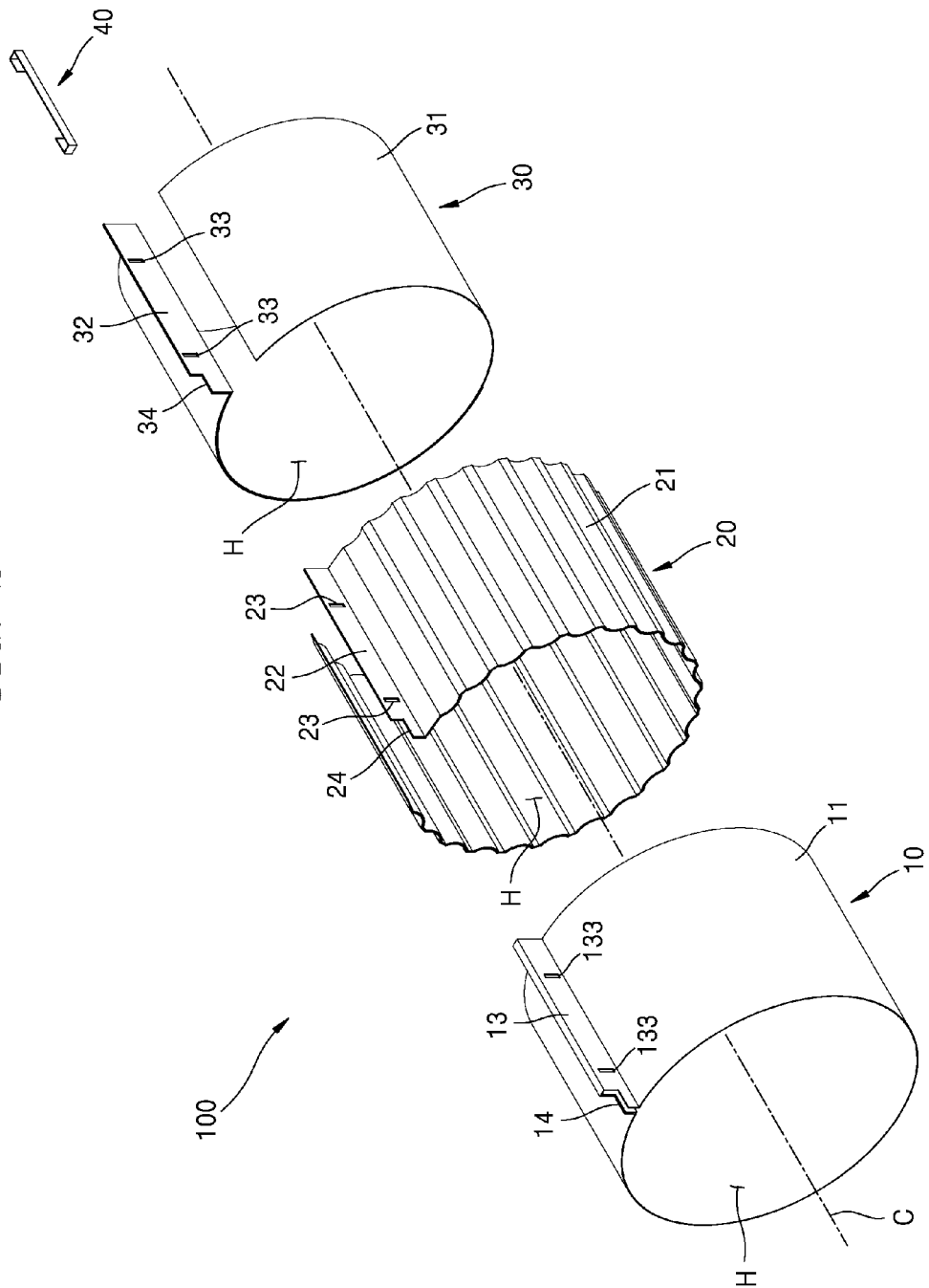
FIG. 2 is an exploded perspective view of the journal foil air bearing of FIG. 1.
Figure 3:
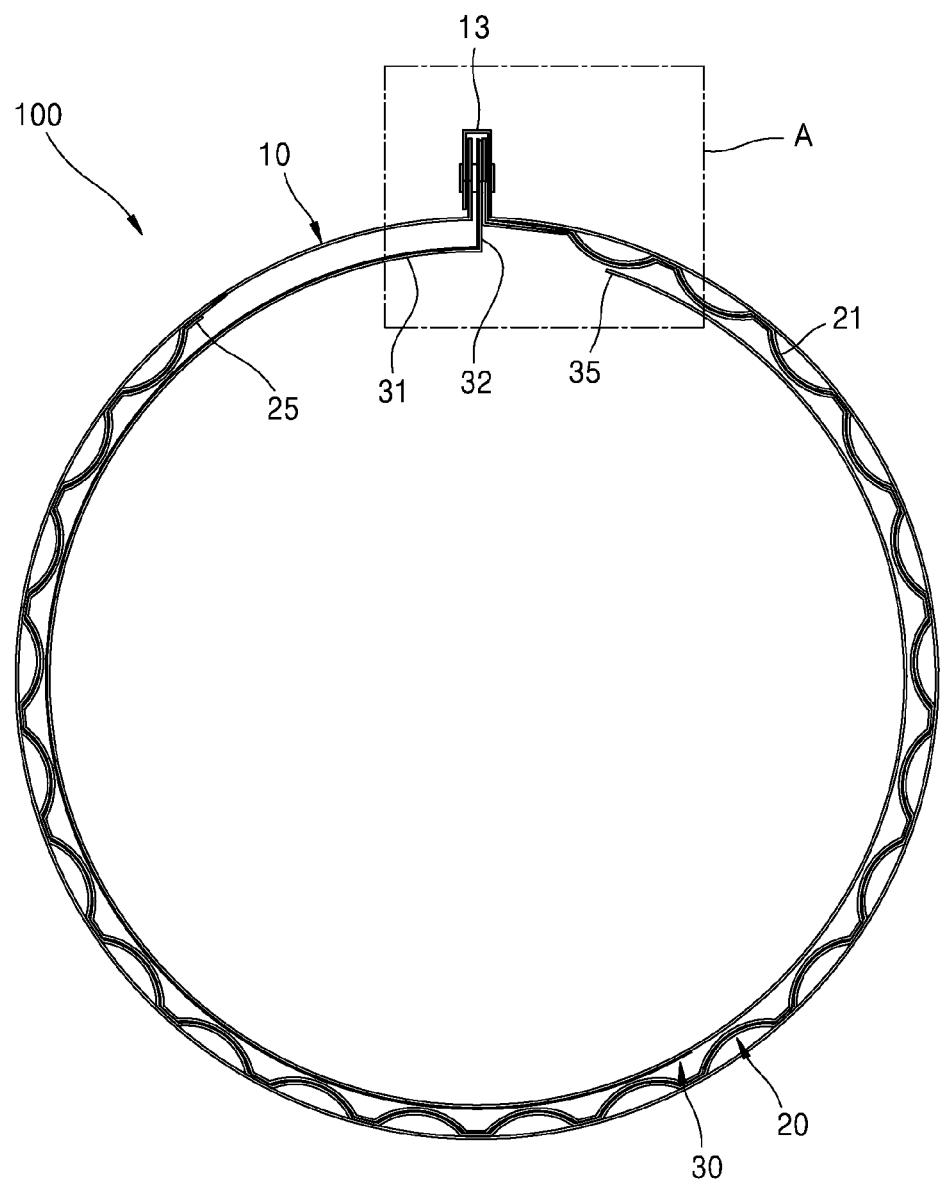
FIG. 3 is a front view of the journal foil air bearing of FIG. 1.

FIG. 1 is perspective view of a journal foil air bearing 100 according to an embodiment of the present invention. FIG. 2 is an exploded perspective view of the journal foil air bearing 100 of FIG. 1. FIG. 3 is a front view of the journal foil air bearing 100 of FIG. 1.

Referring to FIGS. 1 through 3, the journal foil air bearing 100 according to a preferred embodiment of the present invention that is a journal foil air bearing for supporting a load applied in a radial direction of a rotating shaft F that rotates about a central line C includes a base foil 10, a bump foil 20, a top foil 30, and a coupling unit.

Figure 5:
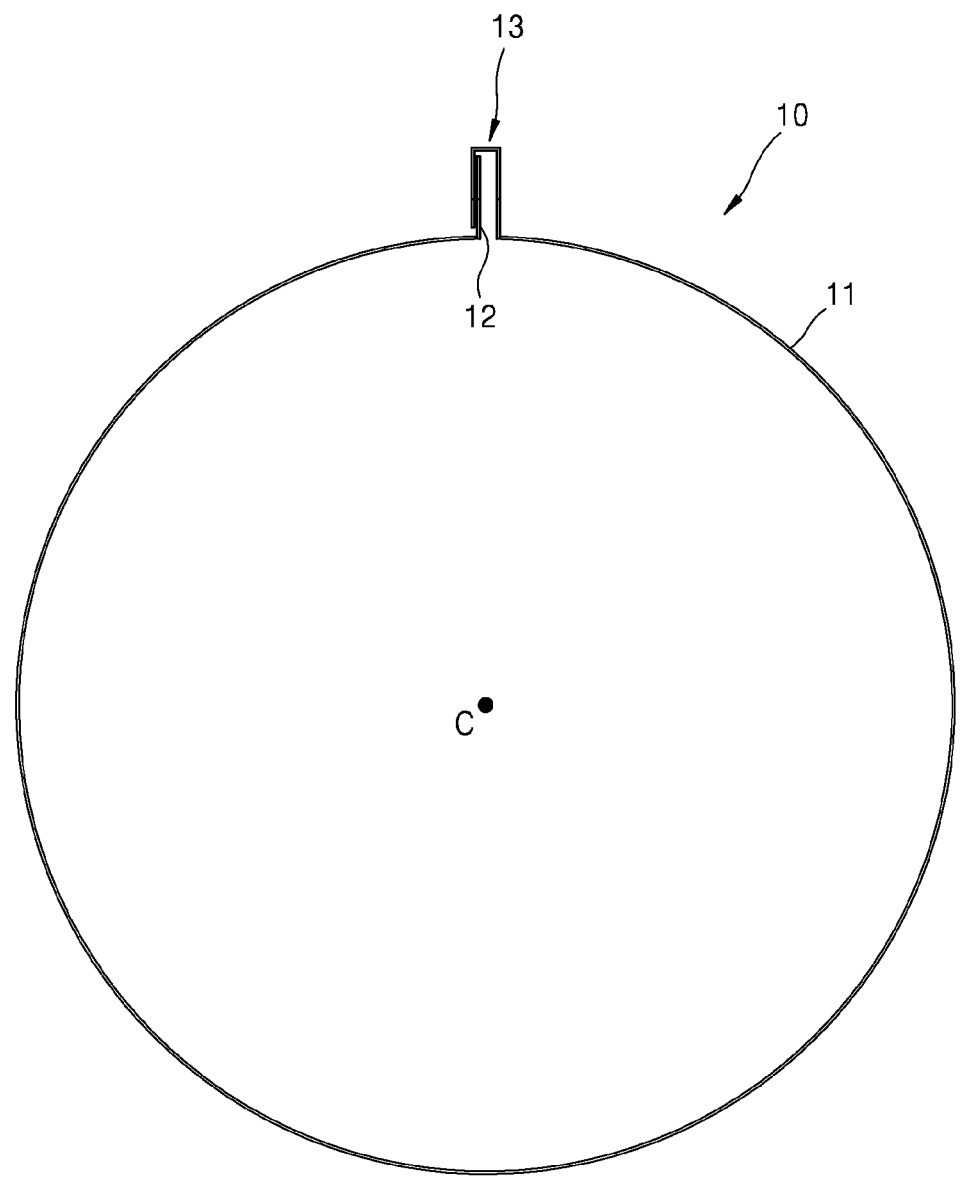
FIG. 5 is a front view of a base foil of FIG. 3.

The base foil 10 that is a circular pipe member manufactured by performing press working on a soft elastic metal thin plate, as shown in FIG. 5 includes a base foil body 11, an insertion portion 12, a receiving portion 13, and an assembly direction identification groove 14.

In the present embodiment, the base foil 10 is formed by rolling a press worked rectangular metal thin plate about the central line C into a pipe shape having a "C" cross-section.

A hollow hole H is formed in the base foil body 11, which is a circular pipe member extending by a predetermined length along the central line C, about the central line C.

Since the base foil body 11 is located to surround the bump foil 20 as explained below, the bump foil 20 is received in the hollow hole H of the base foil body 11.

Figure 8:
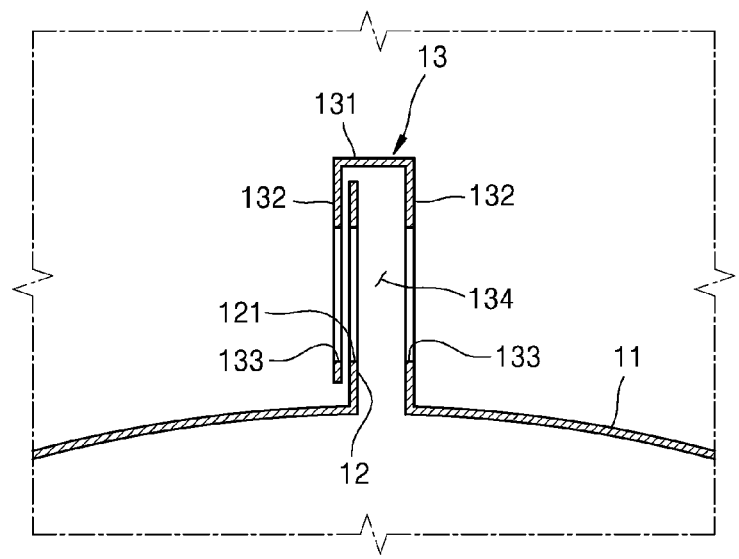
FIG. 8 is a partial enlarged cross-sectional view of the base foil of FIG. 5.

The insertion unit 12 is formed on a left end portion of the base foil body 11, as shown in FIG. 8. In the present embodiment, the insertion unit 12 is formed by bending the left end portion of the base foil body 11 into an "L" shape and extending the left end portion of the base foil body 11 upward so that the base foil body 11 is received in the receiving portion 13 as explained below in the present invention.

One pair of coupling holes 121 that are spaced apart from each other by a predetermined interval along the central line C, as shown in FIG. 8, are formed in the insertion portion 12.

The receiving portion 13 is formed on a right end portion of the base foil body 11, as shown in FIG. 8, and includes a horizontal portion 131, vertical portions 132, coupling holes 133, and a receiving space 134.

The horizontal portion 131 is a rectangular horizontal upper part of a portion that is formed by bending the right end portion of the base foil body 11 into a "∩" shape, as shown in FIG. 8.

One pair of vertical portions 132 that vertically extend downward from both ends of the horizontal portion 131, as shown in FIG. 8, are spaced apart from each other by a predetermined interval.

The coupling holes 133 that are respectively formed in the one pair of vertical portions 132, as shown in FIG. 2, are spaced apart from each other by a predetermined interval along the central line C.

The coupling holes 133 are formed to correspond to the coupling holes 121 formed in the insertion portion 12.

Figure 4:
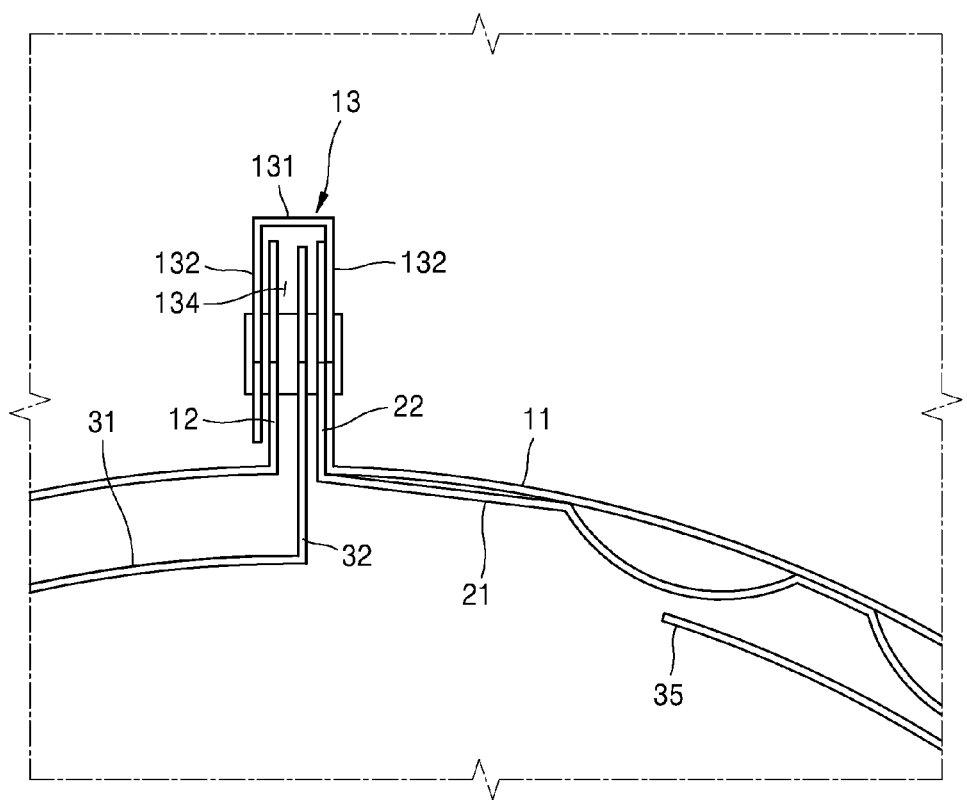
FIG. 4 is an enlarged view illustrating a region "A" of the journal foil air bearing of FIG. 3.

The receiving space 134 is formed under the horizontal portion 131 when the right end portion of the base foil body 11 is bent into a "∩" shape, as shown in FIG. 4, and is open toward the central line C.

The receiving space 134 is a space for receiving an insertion portion 32 of the top foil 30, an insertion portion 22 of the bump foil 20, and the insertion portion 12 of the base foil 10.

Figure 12:
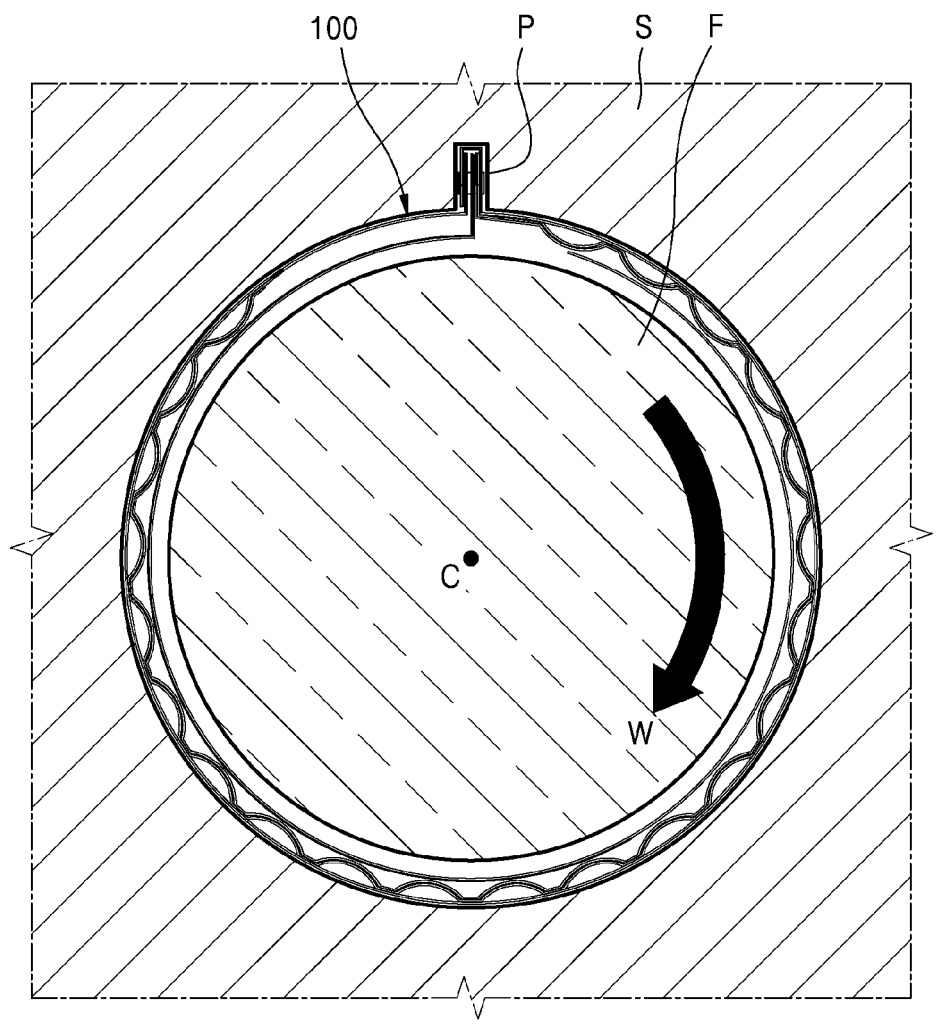
FIG. 12 is a view illustrating a state where the journal foil air bearing of FIG. 1 is mounted on a bearing housing.

In the present embodiment, the receiving portion 13 protrudes in the radial direction from an outer circumferential surface of the base foil body 11 so that the receiving portion 13 is inserted into a housing groove P formed in an inner circumferential surface of the bearing housing S, as shown in FIG. 12.

The assembly direction identification groove 14 that is a groove having an "L" shape formed in a front end portion of the base foil 10, as shown in FIG. 1, prevents an operator's error in an assembling or mounting process when the journal foil air bearing 100 is assembled or mounted.

Figure 6:
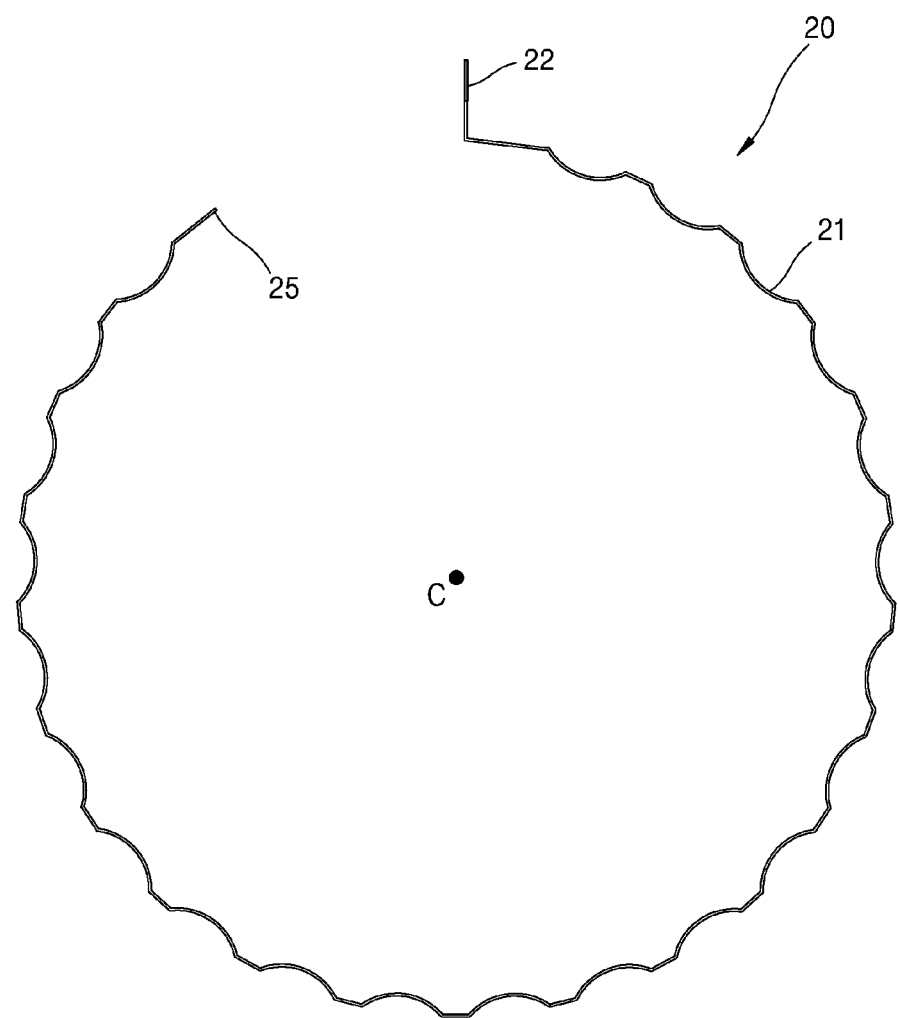
FIG. 6 is a front view of a bump foil of FIG. 3.

The bump foil 20 that is a circular pipe member manufactured by performing press working on a soft elastic metal thin plate, as shown in FIG. 6, includes a bump foil body 21, the insertion portion 22, coupling holes 23, and an assembly direction identification groove 24.

The bump foil body 21 is a circular pipe member extending by a predetermined length along the central line C, and a hollow hole H is formed in the bump foil body 21 about the central line C.

In the present embodiment, the bump foil body 21 is formed by rolling a press worked rectangular metal thin plate about the central line C into a pipe shape having a "C" cross-section.

The bump foil body 21 that is received in the hollow hole H of the base foil 10 is located to surround the top foil 30.

The bump foil body 21 includes a portion having a wave shape in which a plurality of ridges and furrows are alternately connected so that the bump foil body 212. is elastically deformed in the radial direction of the central line C.

The insertion portion 22 is formed on a right end portion of the bump foil body 21, as shown in FIG. 6. In the present embodiment, the insertion portion 22 is formed by bending the right end portion of the bump foil body 21 into an "L" shape and extending the right end portion of the bump foil body 21 upward so that the insertion portion 22 is received in the receiving portion 13 as explained below.

One pair of coupling holes 23 that are spaced apart from each other by a predetermined interval along the central line C. as shown in FIG. 2, are formed in the insertion portion 22.

An assembly direction identification groove 24 that is a groove having an "L" shape formed in a front end portion of the bump foil 20, as shown in FIG. 1, prevents an operator's error in an assembling or mounting process when the journal foil air bearing 100 is assembled or mounted.

The assembly direction identification groove 24 is formed to correspond to the assembly direction identification groove 14 and have the same shape as that of the assembly direction identification groove 14.

A left end portion of the bump foil body 21 is a free end that may freely move, as shown in FIG. 6.

Figure 7:
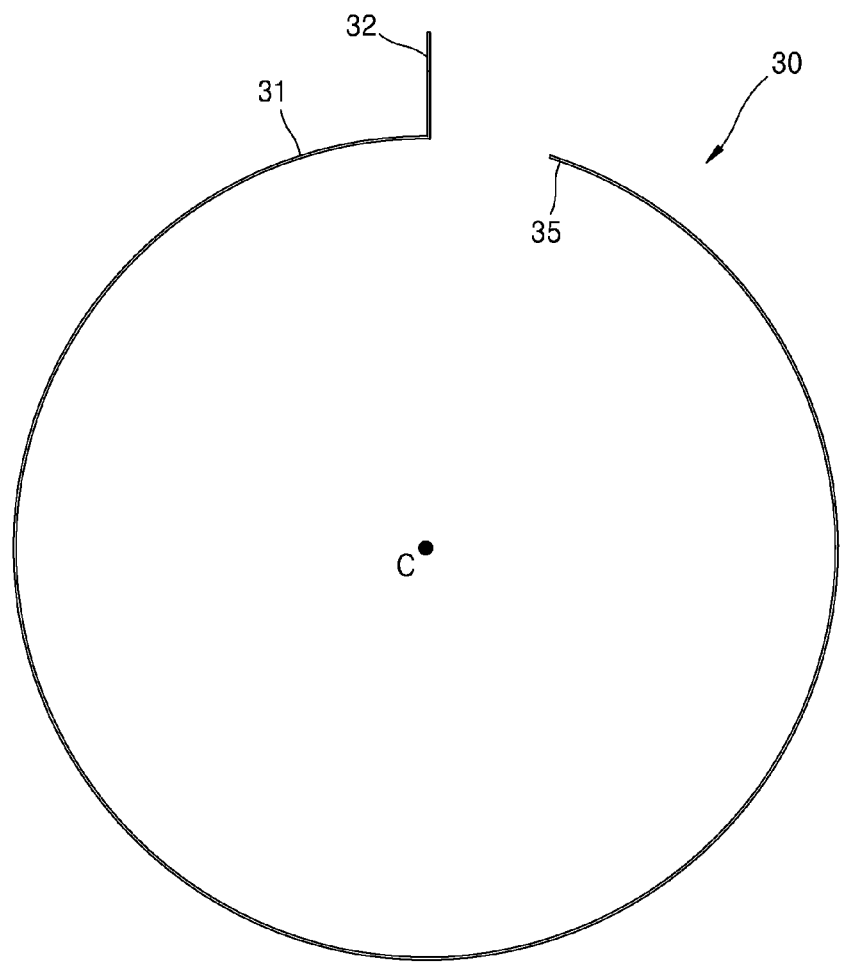
FIG. 7 is a front view of a top foil of FIG. 3.

The top foil 30 that is a circular pipe member manufactured by performing press working on a soft elastic metal thin plate, as shown in FIG. 7, is located to face an outer circumferential surface of the rotating shaft F and includes a top foil body 31, the insertion portion 32, coupling holes 33, and an assembly direction identification groove 34.

The base foil 10, the bump foil 20, and the top foil 30 may be formed of metal thin plates having the same material and may have different thicknesses.

The top foil body 31 is a circular pipe member extending by a predetermined length along the central line C, and a hollow hole H is formed in the top foil body 31 about the central line C.

In the present embodiment, the top foil body 31 is formed by rolling a press worked rectangular metal thin plate about the central line C into a pipe shape having a "C" cross-section.

The top foil body 31 that is received in the hollow hole H of the bump foil 20 is located to surround the rotating shaft F.

The insertion portion 32 is formed on a left end portion of the top foil body 31, as shown in FIG. 7. In the present embodiment, the insertion portion 32 is formed by bending the left end portion of the top foil body 31 into an "L" shape and extending the left end portion of the top foil body 31 upward so that the insertion portion 32 is received in the receiving portion 13 as explained below.

One pair of coupling holes 33 that are spaced apart from each other by a predetermined interval along the central line C, as shown in FIG. 2, are formed in the insertion portion 32.

The assembly direction identification groove 34 that is a groove having an "L" shape formed in a front end portion of the top foil 30, as shown in FIG. 1, prevents an operator's error in an assembling or mounting process when the journal foil air bearing 100 is assembled or mounted.

The assembly direction identification groove 34 is formed to correspond to each of the assembly direction identification grooves 14 and 24 and have the same shape as that of each of the assembly direction identification grooves 14 and 24.

A right end portion of the top foil body 31 is a free end that may freely move, as shown in FIG. 7.

A coating material (not shown) including polytetrafluoroethylene (PTFE) is applied to a surface of the top foil 30 that faces the outer circumferential surface of the rotating shaft F. PTFE is also called Teflon.

The coupling unit s a unit for coupling the insertion portion 32 of the top foil 30, the insertion portion 22 of the bump foil 20, and the insertion portion 12 of the base foil 10 received in the receiving portion 13 of the base foil 10 to the receiving portion 13 of the base foil 10.

In the present embodiment, the coupling unit includes the coupling holes 121, 133, 23, and 33 and a coupling member 40.

The coupling holes 121, 133, 23, and 33 have already been explained above, and thus an explanation thereof will not be given.

Figure 10:
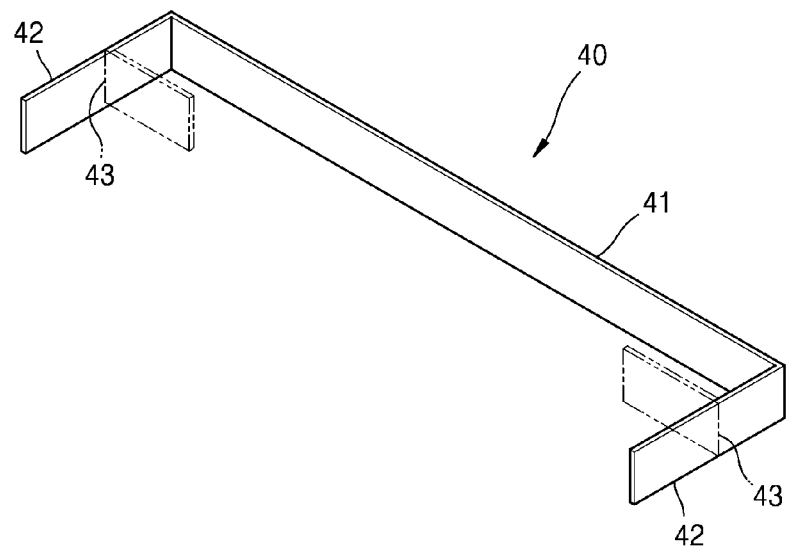
FIG. 10 is a perspective view of a coupling member of FIG. 1.

The coupling member 40 that is a thin plate member having a " ⌐ " shape, as shown in FIG. 10, is inserted into the coupling holes 121, 133, 23, and 33 to fix the top foil 30, the bump foil 20, and the base foil 10. The coupling member 40 includes a body portion 41 and through-passing portions 42.

The body portion 41 having a long band shape is located on an outer surface of one of the vertical portions 132 along the central line C.

The through-passing portions 42 that are inserted into the coupling holes 121, 133, 23, and 33 are located on both ends of the body portion 41.

In the present embodiment, the through-passing portions 42 are formed by bending the body portion 41 into a " ⌐ " shape.

Figure 9:
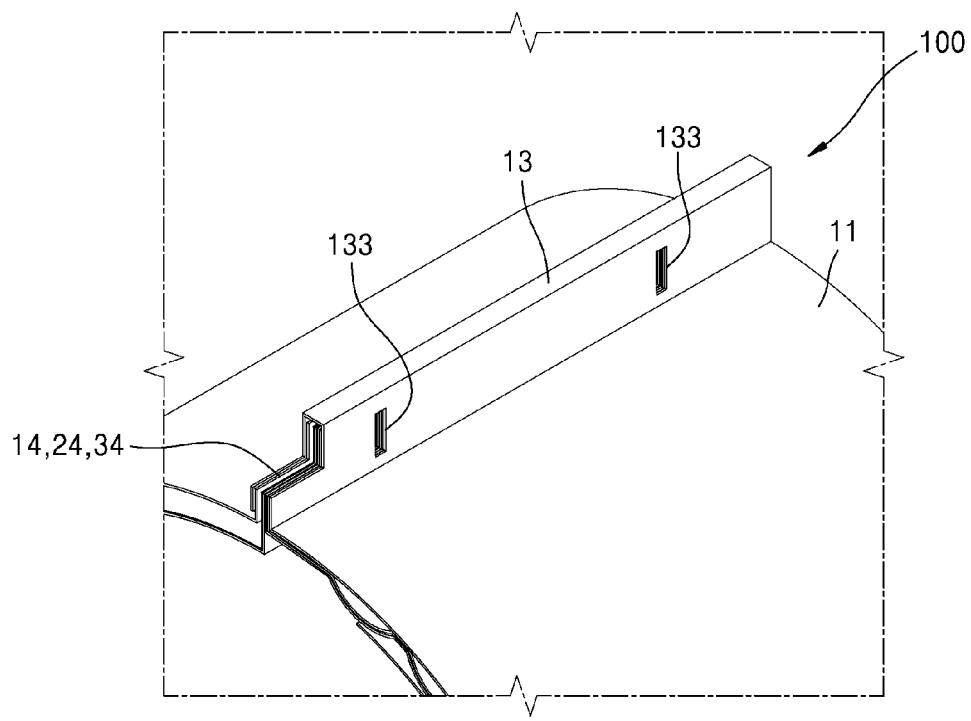
FIG. 9 is a view illustrating a state before a coupling member of the journal foil air bearing of FIG. 1 is mounted.
Figure 11:
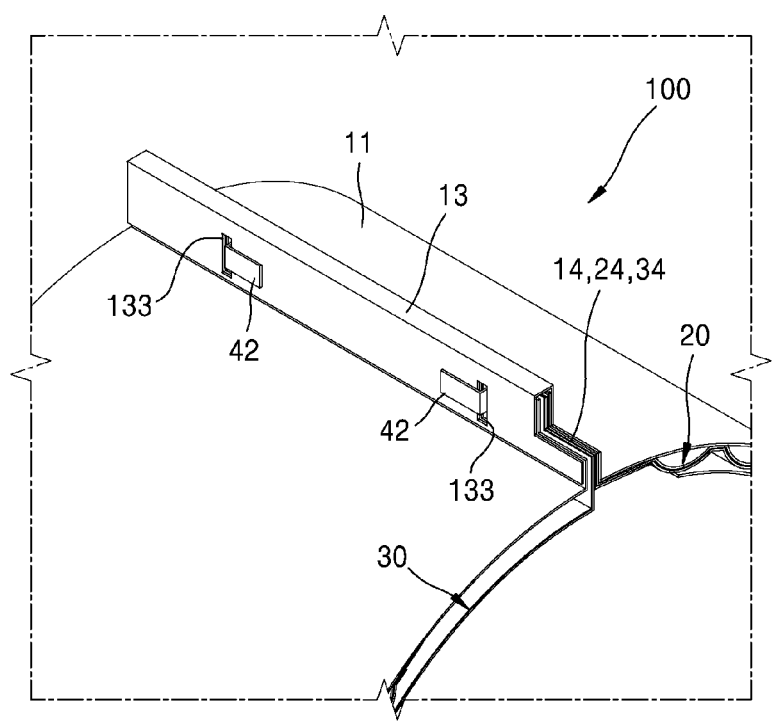
FIG. 11 is a view illustrating a state where the coupling member of FIG. 10 is mounted.

Since the through-passing portions 42 are inserted into the one pair of coupling holes 133, as shown in FIG. 9, and then are bent along virtual bending lines 43, as shown in FIGS. 10 and 11, the through-passing portions 42 are firmly coupled to the receiving portion 13 without being separated from the receiving portion 13.

The through-passing portions 42 are sufficiently inserted into the coupling holes 133 so that the body portion 41 is closely attached to an outer surface of one of the one pair of vertical portions 132 and the through-passing portions 42 protrude outward from the coupling holes 133 of the remaining vertical portion 132, and then are bent along the virtual bending lines 43 to undergo plastic deformation.

In the present embodiment, since the top foil 30, the bump foil 20, and the base foil 10 are automatically cut and bent by using press working without using a welding process, the top foil 30, the bump foil 20, and the base foil 10 have shapes that may be mass-produced.

A method of assembling and mounting the journal foil air bearing 100 constructed as above will now be explained.

First, when the coupling member 40 is not mounted as shown in FIG. 9, the base foil 10, the bump foil 20, and the top foil 30 are assembled. In this case, the top foil 30 is located to face an outer circumferential surface of the rotating shaft F, the bump foil 20 is located to surround the top foil 30, and the base foil 10 is located to surround the bump foil 20, as shown in FIG. 4.

When the base foil 10, the bump foil 20, and the top foil 30 are assembled as shown in FIG. 9, the coupling holes 121, 133, 23, and 33 are aligned.

Next, when the through-passing portions 42 of the coupling member 40 having a " ⌐ " shape are inserted into the coupling holes 133, as shown in FIG. 10, the through-passing portions 42 sequentially pass through the coupling holes 133 of the right vertical portion from among the one pair of vertical portions 132, the coupling holes 23 of the bump foil 20, the coupling holes 33 of the top foil 30, the coupling holes 121 of the insertion portion 12, and the coupling holes 133 of the left vertical portion from among the one pair of vertical portions 132, as shown in FIG. 4, and then protrude by a predetermined length.

When the through-passing portions 42 are bent along the virtual bending lines 43 to undergo plastic deformation, as shown in FIGS. 10 and 11, the coupling member 40 is firmly coupled to the receiving portion 13 without being separated from the receiving portion 13, thereby completely assembling the journal foil air bearing 100.

When the journal foil air bearing 100 that is modularized in this manner is inserted into the bearing housing S including the housing groove P formed in an upper end portion of an inner circumferential surface of the bearing housing S, as shown in FIG. 12, the journal foil air bearing 100 is completely mounted. In this case, an operator may accurately identify a mounting position and a direction of the journal foil air bearing 100 by using the assembly direction identification grooves 14, 24, and 34, and may simply mount the journal foil air bearing 100 on the bearing housing S by pushing the journal foil air bearing 100 along the central line C. The receiving portion 13 is received in the housing groove P.

Since the journal foil air bearing 100 constructed as above includes the top foil 30 that is located to face the outer circumferential surface of the rotating shaft F and surrounds the rotating shaft F, the bump foil 20 that is an elastically deformable member and is located to surround the top foil 30, and the base foil 10 that is located to surround the bump foil 20, the receiving portion 13 in which a first end portion of the top foil 30, a first end portion of the bump foil 20, and a second end portion of the base foil 10 are received is provided on a first end portion of the base foil 10, and the journal foil air bearing 100 also includes the coupling unit that couples the first end portion of the top foil 30, the first end portion of the bump foil 20, and the second end portion of the base foil 10 received in the receiving p on 13 to the receiving portion 13 of the base foil 10, the journal foil air bearing 100 may be easily assembled in advance and modularized into one piece, may be very conveniently mounted or disassembled on the bearing housing S in a workplace, and may be easily stored and managed.

Figure 13:
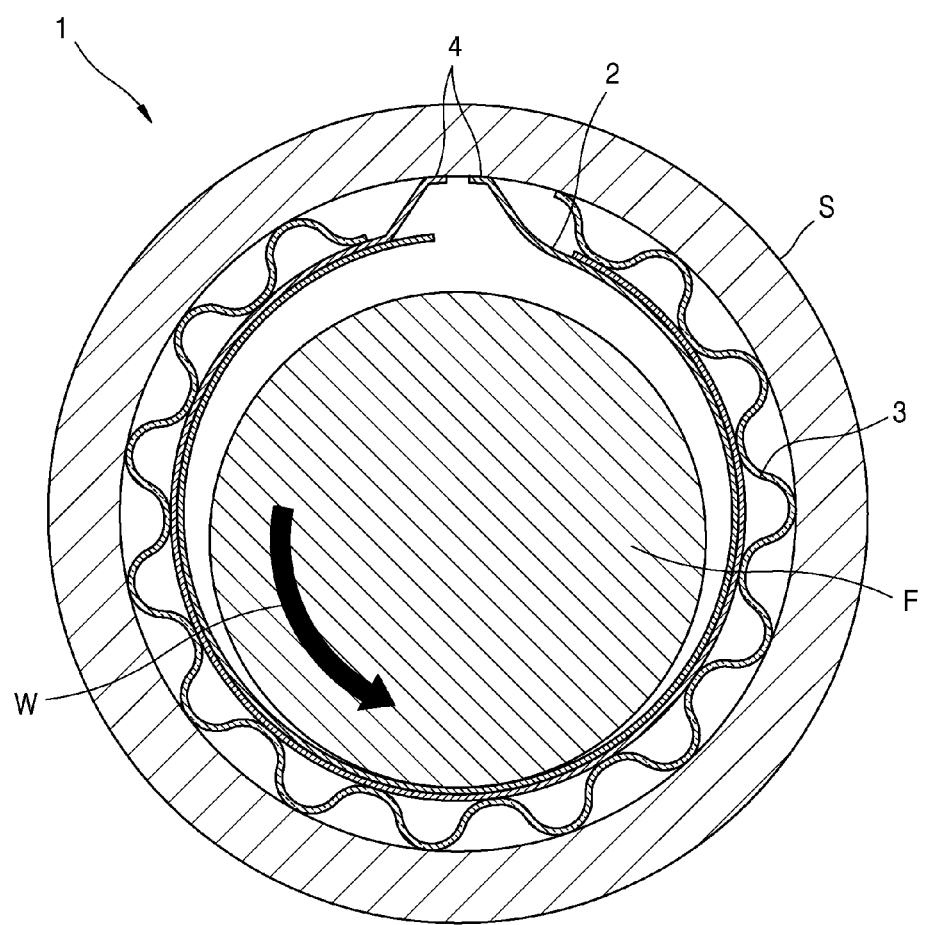
FIG. 13 is a cross-sectional view of a conventional journal foil air bearing.

Also, since the base foil 10 may maintain and support outer appearances of the bump foil 20 and the top foil 30, and an inner circumferential surface of the base foil 10 is formed of a smooth thin plate and thus has a shape tolerance and a surface friction that are better than those of an inner circumferential surface of the bearing housing S, even when a surface treatment state of an inner surface of the bearing housing S is poor, the journal foil air bearing 100 may be easily mounted and the performance of the journal foil air bearing 100 may be hardly affected, unlike the conventional journal foil air bearing 1 of FIG. 13 in which an inner circumferential surface of the bearing housing S directly contacts the bump foil 3.

Since the receiving portion 13 of the journal foil air bearing 100 includes the receiving space 134 that is formed by bending an end portion of the base foil 10 into a "∩" shape, the base foil 10 may he mass-produced by using press working without using a welding process.

Also, since the top foil 30, the bump foil 20, and the base foil 10 respectively include the insertion portions 32, 22, and 12 that are formed by bending the first end portion of the top foil 30, the first end portion of the bump foil 20, and the second end portion of the base foil 10 into "L" shapes so that the insertion portions 32, 22, and 12 are received in the receiving portion 13, the insertion portions 12, 22, and 32 may be mass-produced by using press working without using a welding process and may be conveniently received in the receiving portion 13.

Since the receiving portion 13 protrudes in a radial direction from an outer circumferential surface of the base foil 10, the journal foil air bearing 100 may be mounted on the bearing housing S in an accurate direction and to an accurate depth by inserting the receiving portion 13 into the housing groove P formed in the bearing housing S.

Also, since the coupling unit of the journal foil air bearing 100 includes the coupling holes 121, 133, 23, and 33 that are formed in the insertion portion 32 of the top foil 30, the insertion portion 22 of the bump foil 20, and the insertion portion 12 of the base foil 10 received in the receiving portion 13, and the receiving portion 13, and the coupling member 40 that is inserted into the coupling holes 121, 133, 23, and 33 and fixes the top foil 30, the bump foil 20, and the base foil 10, the coupling unit may be simply and inexpensively provided on the receiving portion 13.

Also, since the coupling holes 121, 133, 23, and 33 are each formed as one pair, the one pair of coupling holes are spaced apart from each other by a predetermined interval along the central line C, and both end portions of the coupling member 40 that is a thin plate member having a " ⌐ " shape are respectively inserted into the one pair of each of the coupling holes 121, 133, 23, and 33 to undergo plastic deformation, the coupling member 40 occupies a smaller area than bolts and nuts. After the receiving portion 13 is mounted in the housing groove P of the bearing housing S, since the plastic-deformed both end portions of the coupling member 40 are firmly coupled to the housing groove P, there may be no risk that the coupling member 40 is separated from the receiving portion 13.

Also, since the assembly direction identification grooves 14, 24, and 34 that are grooves for preventing an error in an assembling or mounting process are formed in at least one of the top foil 30, the bump foil 20, and the base foil 10, an operator may check an accurate assembly direction and an accurate mounting direction when the journal foil air bearing 100 is assembled or mounted, thereby preventing the operators error.

Since at least one of the top foil 30, the bump foil 20, and the base foil 10 has a shape that may be mass-produced by using press working, the journal foil air bearing 100 may be more suitable for mass-production than a bearing using a method such as welding.

Also, since a coating material including PTFE is applied to a surface of the top foil 30 that faces the outer circumferential surface of the rotating shaft F, even when the rotating shaft F rotates at a high speed, a surface of the top foil 30 may be hardly damaged.

Although a left end portion of the base foil body 11 is bent into a "L" shape and protrudes upward and the receiving portion 13 that is bent into a "∩" shape is formed on a right end portion of the base foil body 11 in the present embodiment, it will he understood that the receiving portion 13 may he omitted and the right end portion of the base foil body 11 may be bent into a "L" shape and protrude upward. In this case, the insertion portion 32 of the top foil 30 and the insertion portion 22 of the bump foil 20 are inserted between the left end portion having a "L" shape and the right end portion having a "L" shape of the base foil body 11.

Although the coupling holes 121, 133, 23, and 33 are each formed at two positions along the central line C in the present embodiment, the coupling holes 121, 133, 23, and 33 may each be formed along the central line at three or more positions. In this case, a plurality of the coupling members 40 may be used or the coupling member 40 may have a shape other than a "⊏" shape.

Although one top foil 30 and one bump foil 20 are mounted in the present embodiment, at least one of the top foil 30 and the bump foil 20 may be mounted at two or more positions.

While the present invention has been particularly shown and described with reference to embodiments thereof, it will be understood by one of ordinary skill in the art that the foregoing is illustrative of embodiments and is not to be construed as limited to the specific embodiments disclosed, and that modifications to the disclosed embodiments, as well as other embodiments, are intended to be included within the technical scope of the present invention.

What is claimed is:

1. A journal foil air bearing for supporting a load applied in a radial direction of a rotating shaft that rotates about a central line, the journal foil air bearing comprising:
   a top foil located to face an outer circumferential surface of the rotating shaft and surround the rotating shaft;
   a bump foil being an elastically deformable member and located to surround the top foil; and
   a base foil located to surround the bump foil,
   wherein a first end portion of the top foil and a first end portion of the bump foil are located between a first end portion of the base foil and a second end portion of the base foil,
   wherein the journal foil air bearing further comprises a coupling unit configured to couple the first end portion of the top foil, the first end portion of the bump foil, the first end portion of the base foil, and the second end portion of the base foil,
   wherein the base foil, the bump foil, and the top foil are modularized into one piece by coupling unit and then the one piece is mounted.

2. The journal foil air bearing of claim 1, wherein a receiving portion in which the first end portion of the top foil, the first end portion of the bump foil, and the second end portion of the base foil are received is formed on the first end portion of the base foil,
   wherein the coupling unit couples the first end portion of the top foil, the first end portion of the bump foil, and the second end portion of the base foil received in the receiving portion to the receiving portion of the base foil.

3. The journal foil air bearing of claim 2, wherein the receiving portion comprises a receiving space formed by bending the first end portion of the base foil into a "∩" shape.

4. The journal foil air bearing of claim 2, wherein the top foil, the bump foil, and the base foil respectively comprise insertion portions formed by bending the first end portion of the top foil, the first end portion of the bump foil, and the second end portion of the base foil into "L" shapes so that the insertion portions are received in the receiving portion.

5. The journal foil air bearing of claim 2, wherein the receiving portion protrudes in the radial direction from an outer circumferential surface of the base foil.

6. The journal foil air bearing of claim 2, wherein the coupling unit comprises:
   coupling holes formed in the receiving portion, the first end portion of the top foil, the first end portion of the bump foil, and the second end portion of the base foil which are received in the receiving portion; and
   a coupling member inserted into the coupling holes to fix the top foil, the bump foil, and the base foil.

7. The journal foil air bearing of claim 6, wherein one pair of the coupling holes are formed to be spaced apart by a predetermined interval along the central line, and both end portions of the coupling member that is a thin plate member having a "⊏" shape are respectively inserted into the one pair of the coupling holes and then are bent to undergo plastic deformation.

8. The journal foil air bearing of claim 1, wherein an assembly direction identification groove for preventing an error in an assembling or mounting process is formed in at least one of the top foil, the bump foil, and the base foil.

9. The journal foil air bearing of claim 1, wherein a coating material comprising polytetrafluoroethylene (PTFE) is applied to one surface of the top foil that faces the outer circumferential surface of the rotating shaft.

* * * * *